(12) United States Patent
Kiely

(10) Patent No.: US 10,234,170 B2
(45) Date of Patent: Mar. 19, 2019

(54) BOILER SYSTEM

(71) Applicant: Pat Kiely, Navan (IE)

(72) Inventor: Pat Kiely, Navan (IE)

( * ) Notice: Subject to any disclaimer, the term of this patent is extended or adjusted under 35 U.S.C. 154(b) by 0 days.

(21) Appl. No.: 15/566,549

(22) PCT Filed: Apr. 21, 2016

(86) PCT No.: PCT/EP2016/058941
§ 371 (c)(1),
(2) Date: Oct. 13, 2017

(87) PCT Pub. No.: WO2016/170080
PCT Pub. Date: Oct. 27, 2016

(65) Prior Publication Data
US 2018/0094832 A1 Apr. 5, 2018

(30) Foreign Application Priority Data

Apr. 21, 2015 (IE) .................... S2015/0115

(51) Int. Cl.
*F24H 1/24* (2006.01)
*F24H 1/34* (2006.01)
(Continued)

(52) U.S. Cl.
CPC ............... *F24H 1/34* (2013.01); *F24H 1/165* (2013.01); *F24H 1/186* (2013.01); *F24H 1/205* (2013.01);
(Continued)

(58) Field of Classification Search
CPC ................. F24H 1/24; F24H 1/26; F24H 1/34
See application file for complete search history.

(56) References Cited

U.S. PATENT DOCUMENTS 431,037 A * 7/1890 Dickinson ................ F24H 1/30
  122/218
454,459 A 6/1891 Dickinson
(Continued)

FOREIGN PATENT DOCUMENTS

FR  2612285 A1  9/1988
JP  S5869347 A  4/1983

OTHER PUBLICATIONS

International Search Report and Written Opinion dated Aug. 5, 2016, for corresponding International Application No. PCT/EP2016/058941; International Filing Date: Apr. 21, 2016, consisting of 7-pages.

*Primary Examiner* — Nathaniel Herzfeld
(74) *Attorney, Agent, or Firm* — Christopher & Weisberg, P.A.

(57) ABSTRACT

The present invention provides a boiler system, for example for use in heating a domestic hot water supply, and which is significantly more fuel efficient than existing boilers, the boiler system comprising a first reservoir and a second reservoir which together define a combustion enclosure, a storage tank positioned to define an upper wall or roof of the enclosure and being in fluid communication with the first water reservoir, a heat exchange tube located in the storage tank and being in fluid communication with the second water reservoir; and a burner arranged to directly heat atmospheric gases within the enclosure in order to indirectly heat the walls of the enclosure.

20 Claims, 9 Drawing Sheets

(51) Int. Cl.
*F24H 1/26* (2006.01)
*F24H 1/20* (2006.01)
*F24H 1/30* (2006.01)
*F24H 1/16* (2006.01)
*F24H 1/18* (2006.01)
*F24H 1/22* (2006.01)
*F24H 1/43* (2006.01)
*F24H 8/00* (2006.01)

(52) U.S. Cl.
CPC ............... *F24H 1/206* (2013.01); *F24H 1/22* (2013.01); *F24H 1/24* (2013.01); *F24H 1/26* (2013.01); *F24H 1/30* (2013.01); *F24H 1/43* (2013.01); *F24H 8/00* (2013.01)

(56) References Cited

U.S. PATENT DOCUMENTS

| | | | | |
|---|---|---|---|---|
| 622,575 | A | | 4/1899 | Walsh |
| 1,338,760 | A | * | 5/1920 | Wells .................. F24H 1/186 122/17.1 |
| 1,959,558 | A | * | 5/1934 | Van Daam .......... F24D 19/0082 126/350.2 |
| 2,426,004 | A | * | 8/1947 | Evans .................. F22B 13/005 122/214 |
| 2,814,278 | A | * | 11/1957 | Cameron ................ F24H 1/205 122/159 |
| 4,296,712 | A | * | 10/1981 | Vogt ....................... F24D 3/082 122/22 |
| 4,356,794 | A | * | 11/1982 | Bouman .................... F24H 1/28 122/155.2 |
| 4,393,814 | A | * | 7/1983 | Sievert ..................... F22B 31/04 122/2 |
| 4,401,101 | A | * | 8/1983 | Lunde ................... F24D 11/002 122/155.2 |
| 5,027,749 | A | * | 7/1991 | Cifaldi ................... F24H 1/205 122/18.31 |
| 5,690,061 | A | | 11/1997 | Lopez |
| 9,671,130 | B2 | * | 6/2017 | Roetker .................. F25B 17/02 |
| 2004/0139929 | A1 | * | 7/2004 | Nightlinger .............. F24H 1/205 122/14.2 |
| 2010/0281899 | A1 | * | 11/2010 | Garrabrant ............. F24D 12/02 62/238.1 |

\* cited by examiner

BOILER SYSTEM

CROSS-REFERENCE TO RELATED APPLICATIONS

This application is a Submission under 35 U.S.C. § 371 for U.S. National Stage Patent Application of, and claims priority to, International Application Number PCT/EP2016/058941 entitled A BOILER SYSTEM, filed Apr. 21, 2016, which is related to and claims priority to Ireland Patent Number S2015/0115, filed Apr. 21, 2015, the entirety of all of which are incorporated herein by reference.

FIELD OF THE INVENTION

This invention relates to a boiler system, for example for use in heating a domestic hot water supply, and which is significantly more fuel efficient than existing boilers.

BACKGROUND OF THE INVENTION

Conventional boilers utilise a fuel such as oil or gas which is generally fed to a burner unit which issues a flame from one or more nozzles, which flame is directed to be incident on one or more thermally conductive, usually metal, walls of the boiler in order to directly heat the walls of the boiler, which in turn heats a supply of water located within the boiler which may then be fed to a hot water supply, for example a domestic hot water supply consisting of a number of radiators and an immersion tank or the like. This conventional type of boiler includes a relatively small supply of water surrounding the combustion chamber, which thus has a relatively low thermal mass with little heat retention capability when the boiler is not operational.

In addition, such conventional boilers have a fixed and relatively limited hot water output, beyond which one or more additional boilers may be required.

It is therefore an object of the present invention to overcome the above-mentioned shortcomings of the prior art.

SUMMARY OF THE INVENTION

According to the present invention there is provided a boiler system comprising a first reservoir and a second reservoir which together define an enclosure; a storage tank positioned to define one wall of the enclosure and being in fluid communication with the first reservoir; a heat exchange tube located in the storage tank and being in fluid communication with the second reservoir; and a burner arranged to directly heat atmospheric gases within the enclosure in order to indirectly heat the walls of the enclosure.

Preferably, the burner is arranged to issue a flame which does not directly heat any wall of the enclosure.

Preferably, the first reservoir is arranged to define first, second, and third walls, and the second reservoir is arranged to define fourth and fifth walls, of the enclosure.

Preferably, the first reservoir is arranged to define first and second side walls and a front wall of the enclosure, and the second reservoir is arranged to define a base and rear wall of the enclosure.

Preferably, a lower end of the storage tank is arranged to define an upper wall of the enclosure.

Preferably, the lower end of the storage tank is concave.

Preferably, the lower end of the storage tank comprises copper in at least the region defining the upper wall of the enclosure.

Preferably, the storage tank is thermally insulated other than the portion defining the one wall of the enclosure.

Preferably, the heat exchange tube comprises a finned coil.

Preferably, the boiler system comprises an exhaust manifold at least partially circumscribing the enclosure and comprising one or more exhaust ports to permit combustion gases to be extracted from the enclosure.

Preferably, the exhaust manifold defines an upper portion of a sidewall of the enclosure.

Preferably, the boiler system comprises an exhaust flue supplied from the exhaust manifold, and a water retaining sleeve circumscribing at least a portion of the length of the flue, the sleeve being in fluid communication between the second reservoir and the heat exchange tube.

Preferably, the boiler system comprises a first pump for pumping water around a closed circuit defined by the second reservoir, the sleeve and the heat transfer tube.

Preferably, the second reservoir is in fluid communication with a lower end of the sleeve, an upper end of the sleeve is in fluid communication with a lower end of the heat transfer tube, and a lower end of the heat transfer tube is in fluid communication with the second reservoir in order to form the closed circuit.

Preferably, the boiler system comprises a heat damper on the exhaust flue.

Preferably, the boiler system comprises a flue gas condenser on the exhaust flue.

Preferably, the boiler system comprises a radiator comprising a heat exchange unit in fluid communication with the storage tank, and at least one fan arranged to generate a flow of air across the heat exchange unit.

Preferably, the at least one fan is thermostat controlled.

Preferably, the boiler system comprises a control system comprising one ore more sensors and one or more actuators to automatically control the operation of the system.

Preferably, the boiler system comprises a bypass circuit operable to connect an outlet of the storage tank directly to an inlet of the first reservoir such as to bypass a hot water system supplied by the boiler system.

BRIEF DESCRIPTION OF THE DRAWINGS

The present invention will now be described with reference to the accompanying drawings, in which;

FIG. 9 illustrates a flow diagram for the boiler system when operating to supply hot water to a circuit of radiators or the like;

DETAILED DESCRIPTION OF THE DRAWINGS

Figure 1:
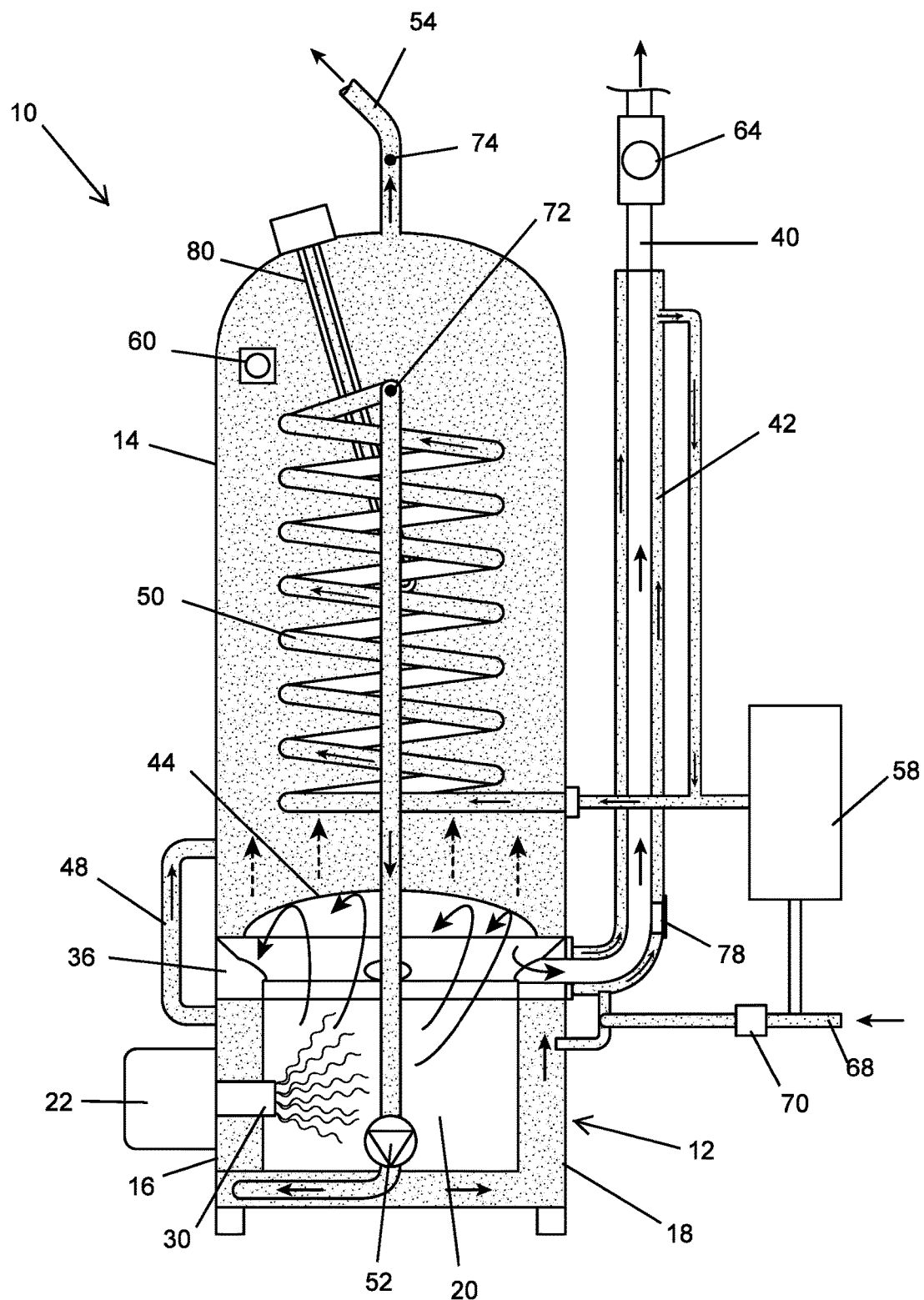
FIG. 1 illustrates a schematic sectioned side view of a boiler system according to an embodiment of the present invention.
Figure 2:
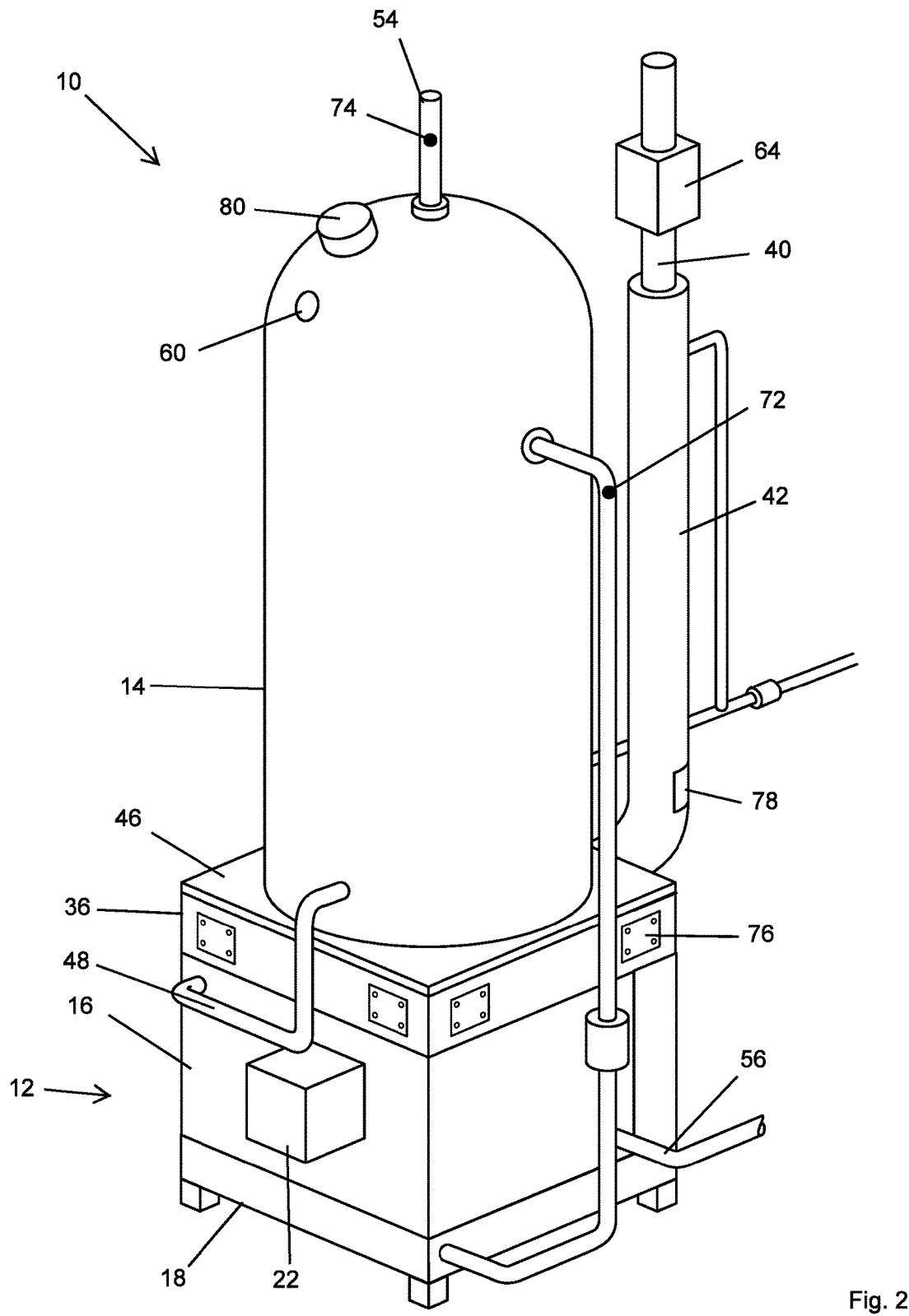
FIG. 2 illustrates a perspective view of the boiler system illustrated in FIG. 1.
Figure 3:
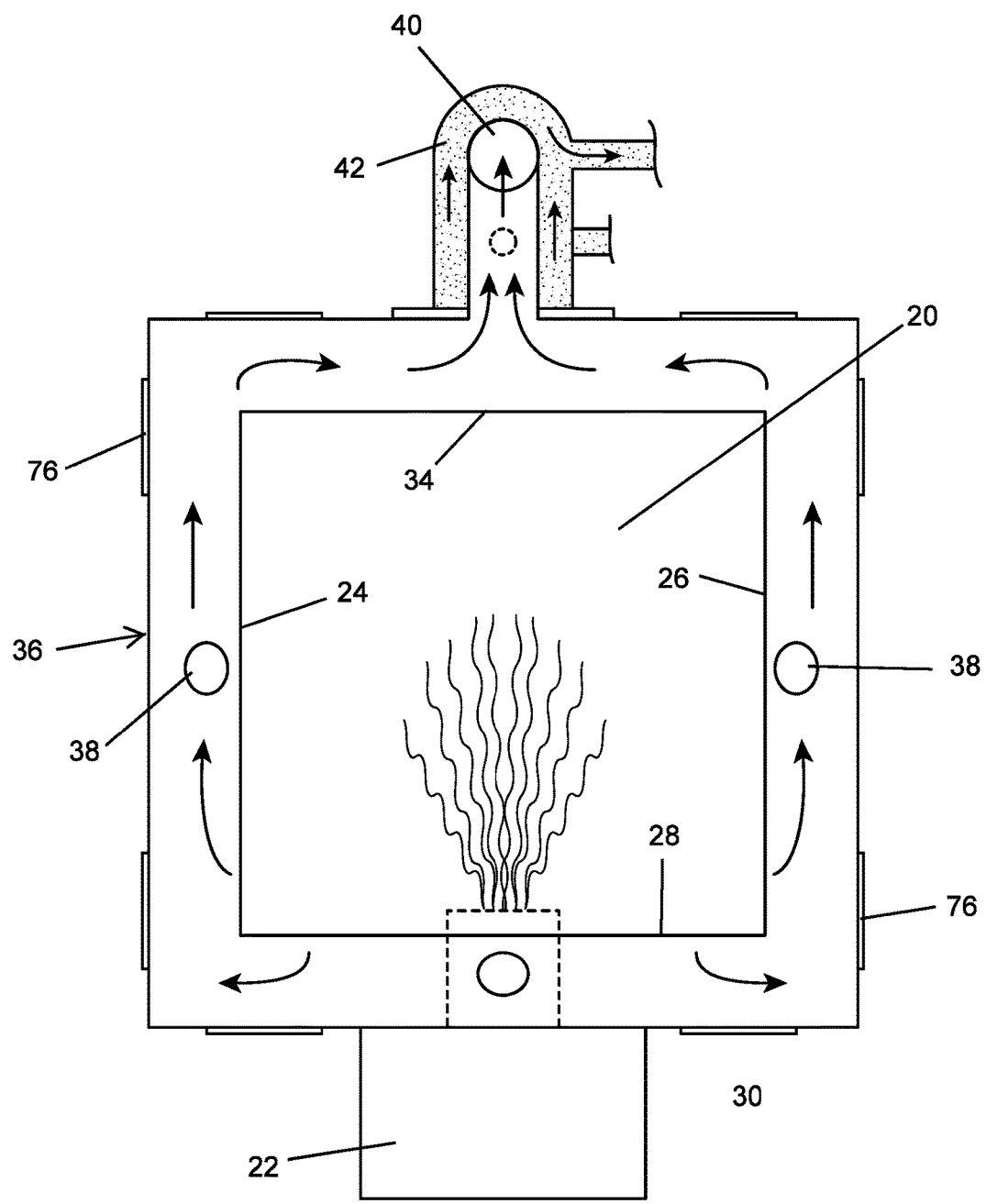
FIG. 3 illustrates a sectioned plan view of a boiler section of the boiler system illustrated in FIGS. 1 and 2.

Referring now to the accompanying drawings there is illustrated a boiler system, generally indicated as 10, for use in heating a medium such as water or other fluid, and in particular for use in a domestic or commercial hot water system which may be used to supply heated water to a collection of radiators or the like, as described hereinafter.

The system 10 comprises a boiler section 12 which in use forms the base of the system 10, and a water storage tank 14 mounted above the boiler section 12, the boiler section 12 being operable as will be described in detail hereinafter to heat water contained within the storage tank 14 for subsequent use by a domestic, commercial or other hot water system which may be connected thereto. The volume of the tank 14 is substantially larger than found in conventional domestic water boilers, and for example may have a volume of at least 70 liters, and may be significantly greater depending on the scale of the hot water system (not shown) to be supplied by the boiler system 10, in particular but not exclusively determine by the number of radiators to be supplied.

The boiler section 12 comprises a first reservoir 16 and a separate second reservoir 18 for retaining water or other fluid to be heated, and which together define a plurality of walls forming an enclosure 20 which in use functions as a combustion chamber within which fuel such as oil or gas, mixed with air and fed to a burner 22 forming part of the system 10, are combusted in order to generate heat.

Figure 4:
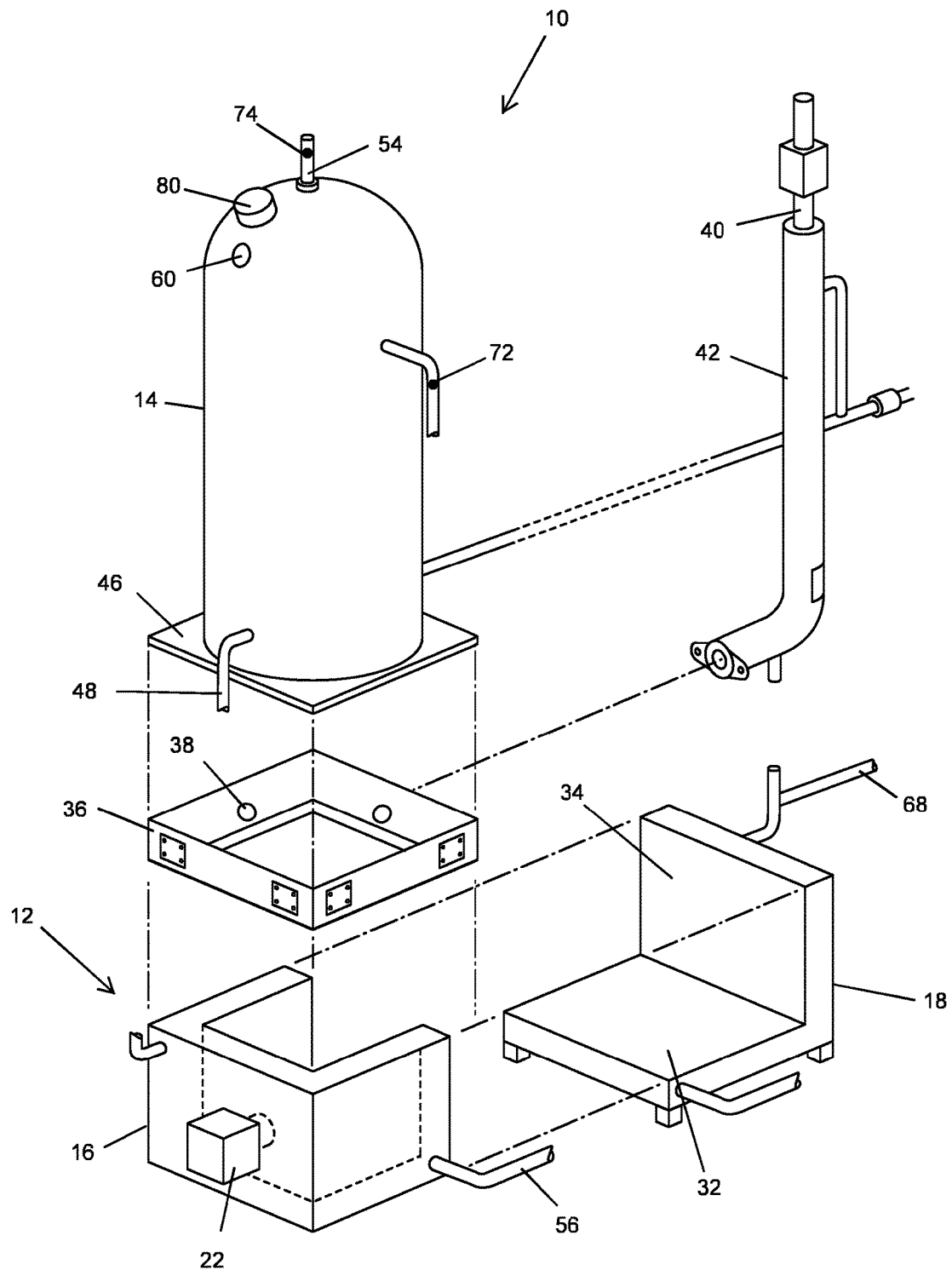
FIG. 4 illustrates an exploded perspective view of the boiler system.
Figure 5:
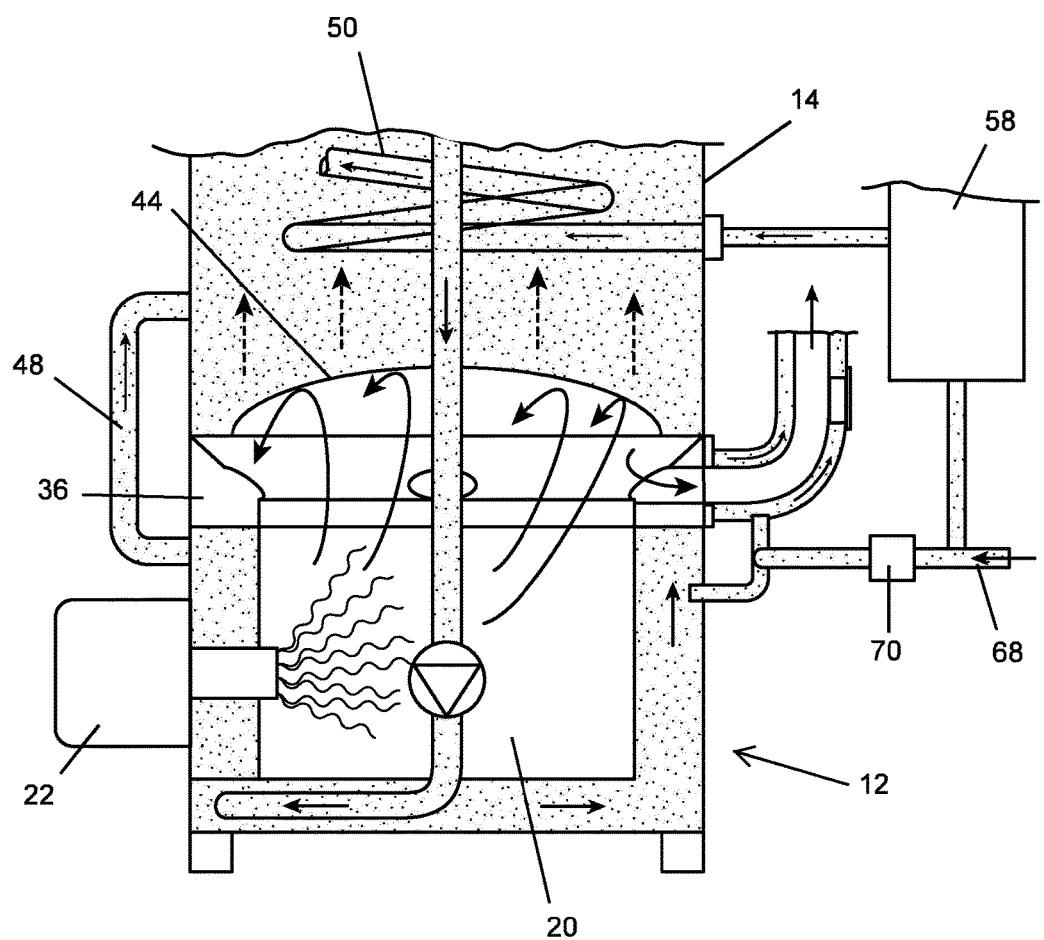
FIG. 5 an enlarged sectioned side view of the boiler section shown in FIG. 3 and a lower portion of a storage tank mounted above the boiler section.

The first reservoir 16 is of double wall construction defining a cavity or space within which water may be retained for heating by means of thermal energy generated through combustion of the above mentioned fuel within the enclosure 20. This cavity between the walls may be provided with baffles (not shown) in order to increase the length of the flow path that water or other circulating fluid must travel, in order to increase the hydraulic retention time within the first reservoir 16 and thus the level of heat transfer to the circulating fluid. The first reservoir 16 defines first and second sidewalls 24, 26, in addition to a front wall 28, of the boiler section 12, and is therefore essentially C-shaped in plan as can be more clearly seen in FIG. 4. The burner 22 is preferably mounted to the front wall 28 and includes a blast tube 30 which extends through a suitable opening in the front wall 28 in order to be directed into the interior space of the enclosure 20. Due to the increased efficiency of the boiler system 10 relative to conventional boilers, the burner 22 can employ a nozzle (not shown) having a reduced diameter and thus reduced oil consumption. In a preferred embodiment the burner 22 employs a Danfoss® 0.50 jet nozzle (not shown) having a rating of 15-18 kW, and can be run at a pressure of approximately 100 psi. A conventional boiler will generally have a rating in the range of 60-70 kW.

The second reservoir 18 defines a base 32 and a rear wall 34 of the boiler section 12, and again is of double wall construction defining a watertight cavity therebetween within which water may be heated by means of thermal energy generated by combustion within the enclosure 20, again as will be described in detail hereinafter. As with the first reservoir 16, the watertight cavity defined within the second reservoir 18 may be provided with baffles (not shown) in order to increase the hydraulic retention time within the second reservoir 18 and thus the level of heat transfer to the circulating fluid contained therein. It will be appreciated from the following description of the invention that the shape and arrangement of the first and second reservoirs 16, 18 may be varied, once both define a respective cavity within which water may be retained and circulated, and once the two reservoirs 16, 18 at least partially form the combustion enclosure 20.

The boiler section 12 additionally comprises an exhaust manifold 36 which effectively forms an upper portion of the sidewalls 24, 26, front wall 28 and rear wall 34. The manifold 36 is of hollow tubular construction, incorporating a plurality of exhaust ports 38 which enable, in use, hot exhaust gasses to pass from the enclosure 20 into the interior of the exhaust manifold 36 from where they are then fed into an exhaust flue 40 which, in the embodiment illustrated, extends from a rear of the boiler section 12. The exhaust flue 40 is provided with a water retaining sleeve 42 which circumscribes the exhaust flue 40, the sleeve 42 being in fluid communication with the second reservoir 18, in order to allow the heat contained within the exhaust gasses to be captured as the gasses pass up the flue 40, the heat contained within the gases being entrained within water being circulated, in use, from the second reservoir 18 into the sleeve 42.

The storage tank 14 is mounted above the boiler section 12 and is tightly sealed against the upper edge of the exhaust manifold 36, a preferably concave lower end 44 of the storage tank 14 thus defining an upper wall of the boiler section 12 and thus closing and sealing the enclosure 20. In the embodiment illustrated the tank 14, including the lower end 44, is circular while the boiler section 12 to which the tank 14 is mounted is of square cross section, and thus a square flange 46 is provided about the lower end 44 in order to form a closure about the upper edge of the exhaust manifold 36, ensuring that the heat generated within the combustion chamber enclosure 20 is focused on the circular underside of the lower end 44 of the tank 14. A thermally insulating gasket (not shown) may be provided between the underside of the flange 46 and the exhaust manifold 36, with a central circular opening in the gasket corresponding in size and shape to the lower end 44 of the tank 12. This will ensure that heat generated within the enclosure will be focused exclusively on the lower end 44, as will be described. It will of course be understood that the shape of both the boiler section 12 and/or the storage tank 14 may be varied, with any suitable connections being provided between the two. The lower end 44 of the tank 14 is also preferably provided with one or more protrusions (not shown) projecting from the side facing into the combustion enclosure 20, for example in the form of concentric arrays of circular fins forming a heat sink defining a circuitous path within which hot gases become constrained, thereby increase the retention time of the gases within the enclosure 20, and in particular in contact with the lower end 44 of the storage tank 14, increasing heat transfer to the water therein.

The interior space of the storage tank 14 is in fluid communication with the first reservoir 16 by means of a connecting pipe 48, although any other suitable means of establishing fluid communication between the first reservoir 16 and the interior of the storage tank 14 may be employed. Thus heated water from within the first reservoir 16 can flow into the storage tank 14. The exact location and orientation of the connecting pipe 48 may be varied as required once providing fluid communication between the first reservoir 16 and the storage tank 14.

In addition, located internally of the storage tank 14 is a heat transfer tube, preferably but not exclusively in the form of a finned coil 50 preferably formed from copper or similar material having high thermal conductivity. The length of the finned coil 50, primarily dictated by the number of turns of the coil 50, may be varied in order to suit the volumetric capacity of the storage tank 14 and/or the hot water system (not shown) being supplied by the boiler system 10. A lower end of the coil 50 is supplied with water from an upper end of the sleeve 42 surrounding the exhaust flue 40, while an upper end of the coil 50 extends outwardly to an exterior of the storage tank 14 and is then fed back downwardly to the second reservoir 18, thus forming a closed circuit incorporating the second reservoir 18, the sleeve 42 and the coil 50. This circuit may be provided with a pump 52 in order to circulate water around the circuit as required. As this is a closed circuit it can be pressurised, for example to 1-2 bar of water pressure.

Turning then to the operation of the boiler system 10, the system 10 is initially installed and is plumbed into the existing hot water supply circuit to be serviced by the system 10. In particular an outlet 54 at the upper end of the storage tank 14 is connected into the hot side of the hot water supply circuit, which may for example deliver hot water to a number of radiators in a domestic dwelling or the like. The return or cold side of the circuit is connected to an inlet 56 of the first reservoir 16. In the preferred embodiment illustrated the inlet 56 is positioned at a lower rear corner of the second sidewall 26 of the first reservoir 16, while the connecting pipe 48 passing water from the first reservoir 16 is positioned at an upper left hand corner of the front wall 28. In this way the two connections are a significant distance from one another, ensuring that the hydraulic retention time of the cold water within the first reservoir 16, between entering the inlet 56 and exiting the connecting pipe 48, will allow significant heating of the water. Any internal modifications to the reservoir 16 may be employed in order to increase the hydraulic retention time, for example the provision of baffles (not shown) as mentioned.

The circuit comprising the second reservoir 18, the sleeve 42 and the finned coil 50 is also filled with water as a heat transfer medium for capturing heat from the exhaust gasses passing through the exhaust flue 40, which would otherwise be wasted to the environment. The exhaust flue 40 is preferably provided with a heat damper 64 at an upper end thereof which is operable to automatically seal the upper end of the flue 40 when the burner 22 is inactive, in order to trap the hot exhaust 40 gasses within the flue 40 to prevent the heat contained therein from being vented to the environment. Additionally or alternatively the exhaust flue 40 may incorporate a flue gas condenser 84 as described and shown with reference to FIGS. 7 to 10 in order to recover the latent heat of vaporisation of the water vapor within the exhaust gases and return it to the water circulating within the boiler system 10. In general when the flue gas condenser 84 is employed the heat damper 64 is omitted, and in many jurisdictions it is now a legal requirement for domestic and other hot water boilers to include a condenser.

When the boiler system 10 is activated the burner 22 will be supplied with fuel, whether oil, gas or other, the fuel being ignited to generate a jet of flame which issues from the blast tube 30 within the enclosure 20. The blast tube 30 and the walls 24, 26, 28 and 34 are arranged relative to one another such that the flame from the blast tube 30 does not directly contact any of the above-mentioned walls, and acts solely to heat the air within the enclosure 20, which hot air will then indirectly heat the walls of the first and second reservoirs 16, 18. By heating the air within the enclosure 20, as opposed to directly heating one wall of the enclosure as is done in a conventional boiler, the heated air will ensure that the heat will be transferred to all the interior surfaces of the enclosure 20, significantly improving the heating process. This heat is then transferred to the water contained within the reservoirs 16, 18, the first reservoir 16 supplying this heated water to the storage tank 14, while the heated water from the second reservoir 18 is circulated around the circuit by the pump 52 in order to capture further heat from the exhaust gasses, which is then transferred to the water contained within the storage tank 14 by means of the finned coil 50.

The hot gasses within the enclosure 20 will also heat the copper lower end 44 of the storage tank 14, thereby allowing heat transfer from the enclosure 20 into the water contained within the storage tank 14. The hot exhaust gasses then exit the enclosure 20 to pass into the exhaust manifold 36 via the plurality of exhaust ports 38. From here the exhaust gasses pass into the exhaust flue 40, and travel up the exhaust flue 40 while transferring heat into the water being circulated through the sleeve 42 from the second reservoir 18. The water in this circuit is thus heated in two stages, the first by means of the hot gasses of the enclosure 20 heating the water as it circulates through the second reservoir 18, and the second phase involving heat transfer from the hot exhaust gasses passing upwardly thought the exhaust flue 40. This heated water is then pumped into the lower end of the finned coil 50 and then upwardly around the coil 50, which is designed with a hydraulic retention time sufficient to allow maximum heat transfer from the water contained within the coil 50 to the water within the storage tank 14. The water then passes from the upper end of the coil 50 to an exterior of the storage tank 14, before being directed back downwardly into the second reservoir 18 to complete the closed circuit and start the cycle over.

Figure 6:
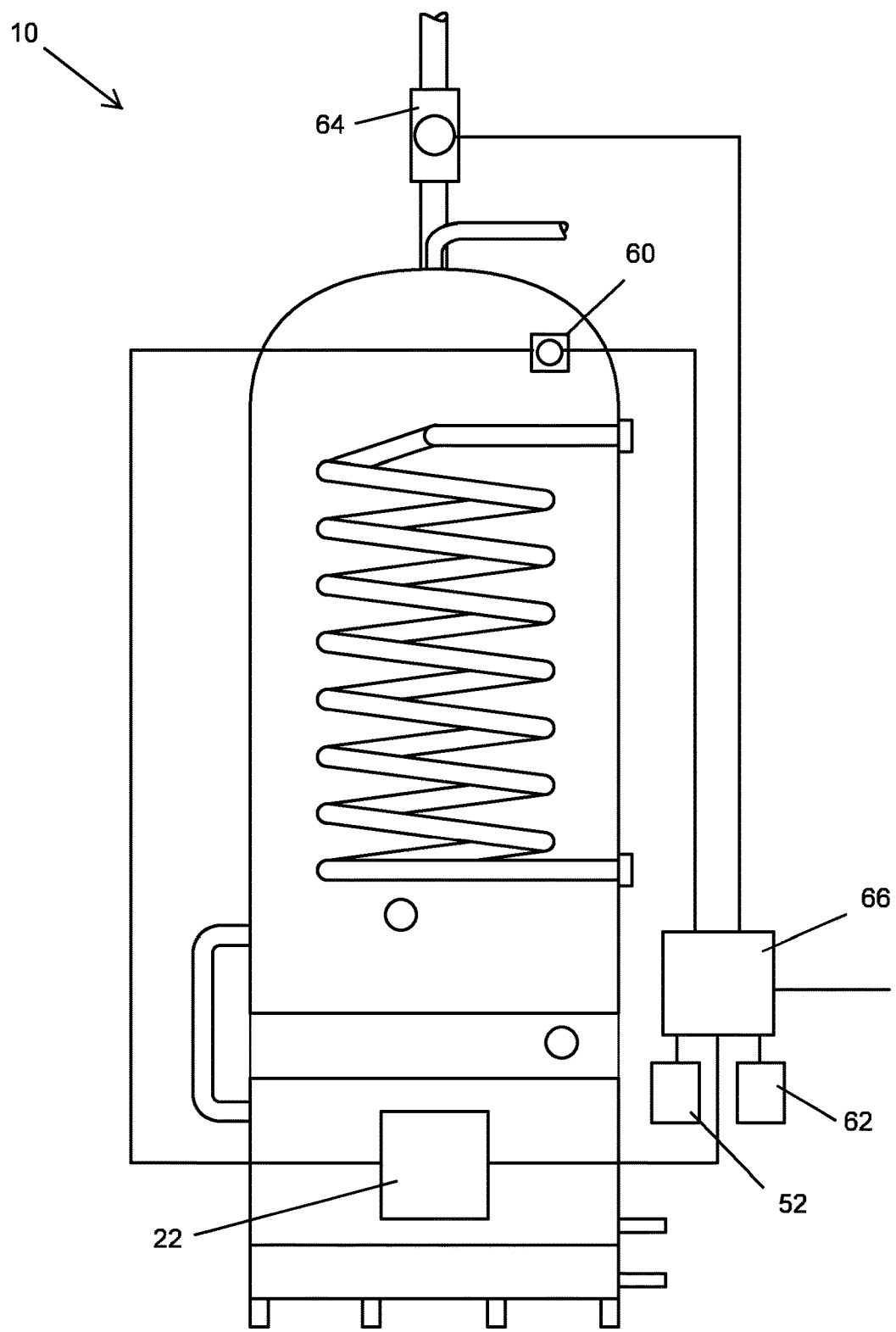
FIG. 6 illustrates a schematic illustration of the control circuitry of the boiler system of the illustrated embodiment of the invention.

In order to allow the automated operation of the boiler system 10, and in particular the burner 22, the system 10 is preferably provided with a temperature sensor in the form of a thermostat 58 arranged to monitor the temperature of the water within the storage tank 14. A controller 66 (shown schematically in FIG. 6) monitors the output of the temperature sensor 58 and signals the burner 22 to start when the temperature of the water within the tank 14 drops below a set lower temperature. Similarly the controller 66 will instruct the burner 22 to turn off when the temperature of the water within the tank 14 goes over a set upper temperature. The controller 66 will also continue to operate a second pump 62 which pumps water from the storage tank 14 to the hot water system being supplied by the boiler system 10. In addition the controller 66 will instruct the heat damper 64 to close when the burner 22 is switched off, in order to trap the hot exhaust gasses within the exhaust flue 40 in order to allow maximum heat transfer from the hot exhaust gasses.

For safety reasons the system 10 may be provided with a pressure vessel 58 (illustrated schematically in FIG. 1) connected by means of a temperature or pressure release valve (not shown), into the closed circuit comprising the second reservoir 18, the sleeve 42 and the finned coil 50. As the water within the closed circuit containing the second reservoir 18 is heated it will undergo expansion, and the pressure vessel 58 will facilitate this expansion. The pressure vessel 58 may also incorporate a pressure release valve 70 which may be configured to vent water from the circuit if the pressure exceeds a predetermined value, for example 3 bar of water pressure.

In addition the system 10 is provided with a mains connection 68 via which the circuit comprising the second reservoir 18, the sleeve 42 and the finned coil 50 may be maintained at a desired operating pressure. The mains connection 68 incorporates the pressure regulating valve 70 which may be set at a fixed pressure, for example 0.5 bar, which pressure will then be maintained within the circuit, while simultaneously maintaining the volume of water within the circuit to compensate for evaporation which may occur through an air vent 72 preferably located at the most elevated point on the circuit, namely the top of the coil 50. A corresponding air vent 74 is also preferably provided at the outlet 54.

The boiler system 10 preferably operates a start-up cycle in order to bring the water within the tank 14 to a pre-set temperature before beginning circulating this heated water to the hot water system being serviced by the boiler system 10. The boiler system 10 thus preferably incorporates a bypass circuit which is automatically operable, for example by means of a temperature regulated valve 75 such as a pipe thermostat, to connect the outlet 54 directly to the inlet 56, thereby bypassing the hot water system of radiators or the like which is normally supplied by the boiler system 10. The valve 75 is arranged to block the return flow of water from the radiator circuit (not shown) or the like until the valve 75 registers a pre-set temperature, for example 50° C., thereby ensuring that the water is initially circulated from the storage tank 14 directly back to the first reservoir 16 until the water reaches a temperature of 50° C. At this point the temperature regulated valve 75 will open in order to allow return flow of water from the radiator circuit to flow through the inlet 56, and consequently allowing the heated water exiting the tank 14 via the outlet 54 to flow into the radiator circuit. In this way the water from the tank 14 will be recirculated directly back to the first reservoir 16, which is then heated from the enclosure 20, and also by the heat transfer from the finned coil 50. Once the temperature within the tank 14 has reached a pre-set limit the bypass circuit (not shown) is switched out in order to allow the hot water to be pumped from the outlet 54 around the hot water system before returning to the inlet 56. It will be appreciated that the valve 75 could be replace by a conventional thermostat (not shown) provided on the tank 14, which could then be used to control a convention solenoid actuated valve (not shown) or the like, to open and close the bypass circuit. It is preferable that the boiler system 10 is employed with an open or vented hot water system, in order to avoid the possibility of unsafe levels of pressure build-up within the circuit including the storage tank 14, which could otherwise damage the storage tank 14, depending on the operating specifications of the tank 14.

For maintenance, inspection and/or cleaning purposes the exhaust manifold 36 is provided with a number of access panels 76 which may be opened or removed in order to allow access to the interior of the exhaust manifold 36. Similarly the flue 40 is preferably provided with an access port 78 via which the interior of the flue 40 may be accessed and cleaned.

For health reasons the system 10 is further preferably provided with an element 80, preferably a simple electrically powered heating element 80, within the storage tank 14 and which may be automatically actuated at pre-set intervals in order to heat the water within the tank 14, for example once a week. Such heating will prevent the growth of legionella bacteria within both the storage tank 14, if unheated by the boiler section 12 for a prolonged period, and for example within any other water reservoir which may be supplied by the storage tank 14, for example a downstream immersion tank or the like.

Figure 7:
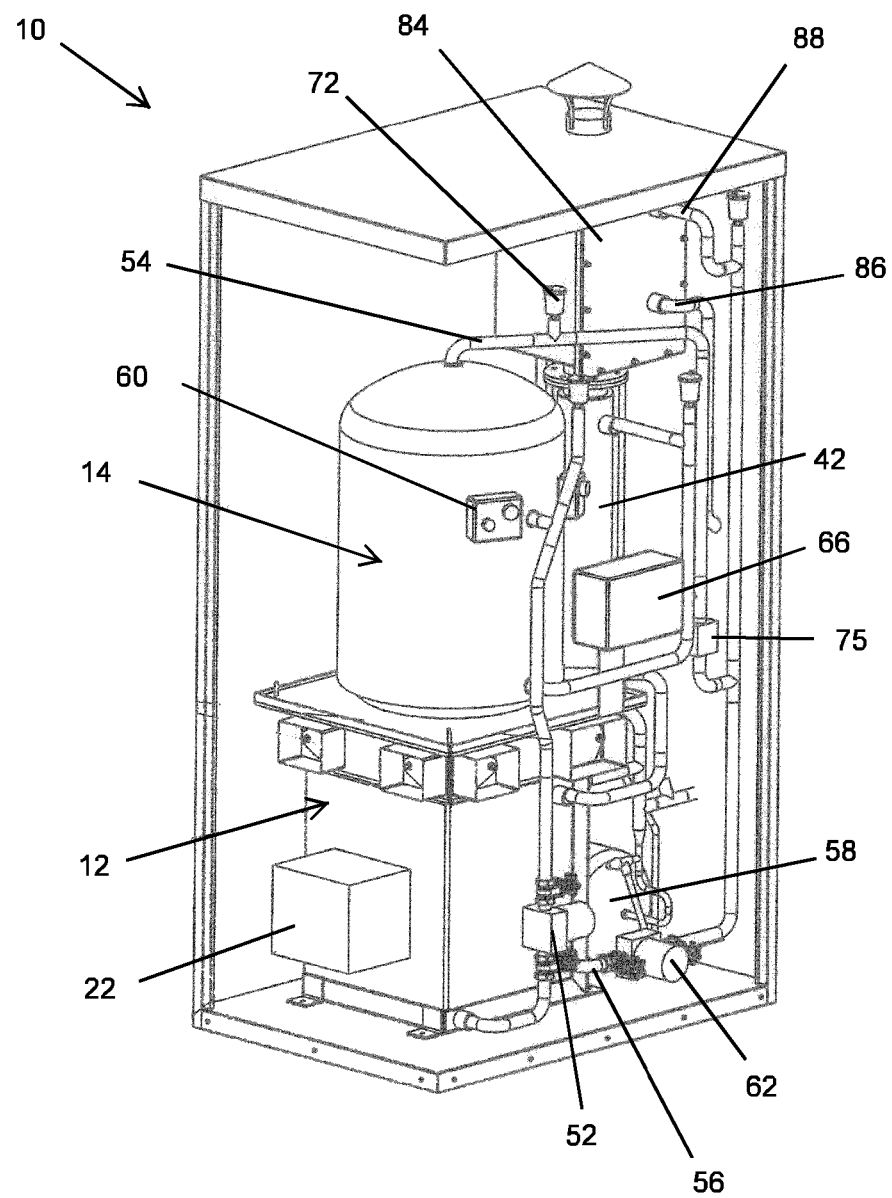
FIG. 7 illustrates a perspective view of the boiler system shown in FIGS. 1 to 6 arranged within a housing which enables the boiler system to be self contained for ease of installation.
Figure 8:
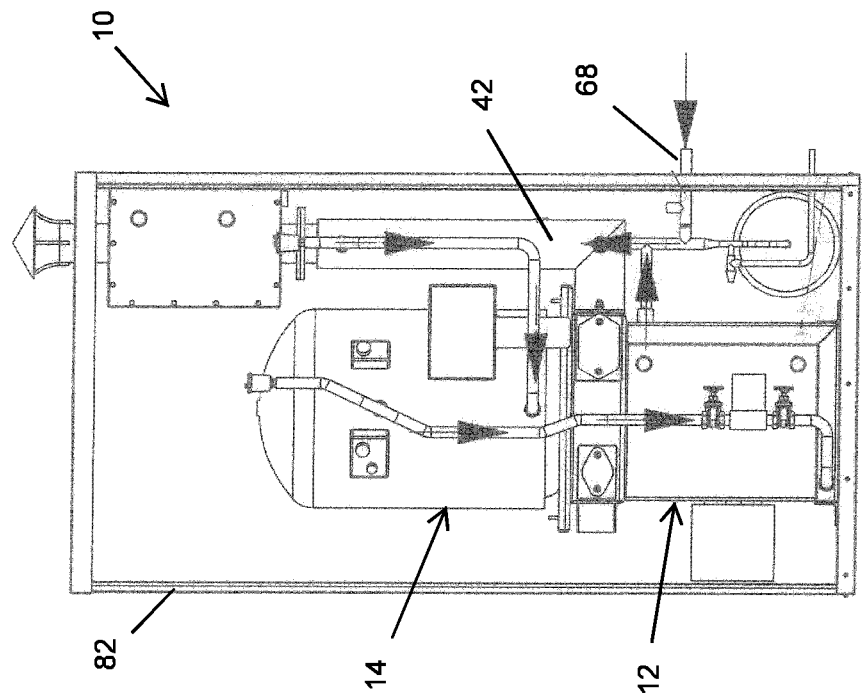
FIG. 8 illustrates a flow diagram for the boiler system during a start up cycle.
Figure 9:
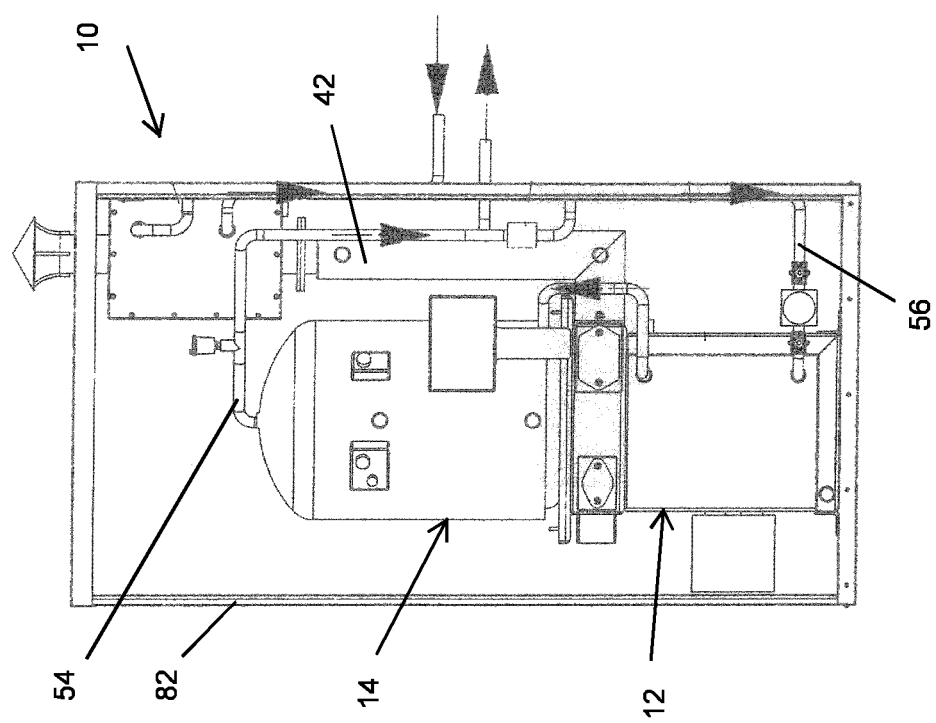

Referring now to FIGS. 7-9, the boiler system 10 is shown fitted within a housing 82 which may be formed from any suitable material, for example sheet metal or the like, which renders the boiler system 10 a fully-contained unit which can be quickly and easily installed, with only a handful of external connections projecting out of the housing 82 in order to allow the boiler system 10 to be plumbed into a hot water system, as described hereinafter. At least one wall or portion of one wall of the housing 82 may be opened or removed in order to provide access to the interior and the components of the boiler system 10 contained therein. In order to fit within the housing 82, the pipework connecting the various components of the boiler system 10 are slightly reconfigured relative to the schematic representations illustrated in FIGS. 1-6. It will be appreciated that the particular arrangement of pipes and componentry may be modified as required once the underlying functionality of the boiler system 10 is retained. The shape and/or dimensions of the housing 82 may be varied to suit different installations, and as a result would require a reconfiguration of the components and connecting pipework, all of which is standard engineering practice for a person of ordinary skill in the art of boiler design. In addition valves (not shown) may be provided at various locations along the different sections of pipework in order to facilitate repair, replacement or modification of the boiler system 10. For example a valve may be place on either side of a component such as a pump or the like in order to allow the valves to be closed and the pump removed for servicing or replacement. Similarly valves may be located on the external pipework connections which project from the housing 82 in order to allow the boiler system 10 to be quickly and easily connected and/or disconnected form the hot water system being supplied.

The housing 82 contains the boiler section 12 and storage tank 14 mounted thereon, in addition to the burner 22, the exhaust flue 40 and the heat recovery sleeve 42 located thereabout. In addition, the pressure vessel 58 is located within the housing 82, and in the arrangement illustrated is located on the floor of the housing 82 adjacent the boiler section 12. As mentioned above, the boiler system 10 is preferably provided with a flue gas condenser 84 which, in the embodiment illustrated, is also located within the housing 82 in an upper region thereof, and is mounted above the heat recovery sleeve 42 as part of the exhaust flue 40, in order to recover the latent heat of vaporisation of water vapour contained within the exhaust gases. With the flue gas condenser 84 forming part of the system the heat damper 64 is omitted.

The flue gas condenser 84 is fed, via an inlet 86, with water returning from the domestic or other hot water circuit supplied by the boiler system 10, which water then flows around the flue gas condenser 84 in order to recover the latent heat of vaporisation from the exhaust flue gases. In the preferred embodiment illustrated the condenser 84 comprises an outer casing contained within which is an array of inverted V shaped fins (not shown) stacked or nested above one another and around which is wound, in contact with the fins, a length of flexible stainless steel piping through which the water flows. Heat from the exhaust gases slowly circulate around the fins, transferring heat to the fins, and through the flexible steel piping, to the water passing therethrough. This preheated water then exits the flue gas condenser 84 via an outlet 88 which is then connected back to the inlet 56 of the first reservoir 16. Thus, the returning water entering the first reservoir 16 will have been preheated by the flue gas condenser 84, thereby increasing the overall efficiency of the boiler system 10. Having passed through the flue gas condenser 84 the flue gases are exhausted to the atmosphere in conventional fashion. In an exemplary embodiment an 8 meter length of the flexible stainless steel piping is utilised within the condenser 84, and the exhaust flue gas enters the condenser 84 at approximately 130° C. and exits at approximately 50° C., thus applying significant preheating to the returning water. Both the casing, fins and flexible piping of the condenser 84 are preferably formed from stainless steel in order to resist corrosion.

Referring briefly to FIG. 8, the start-up cycle described above is illustrated in the form of a flow diagram from which it can be seen that the only external flow into the boiler system 10 is via the mains connection 68 which permits the initial fill of the system 10 and any further top-ups as required. The temperature regulated valve 75 is closed during the start-up cycle, in order to prevent water from being fed out into the hot water system being serviced by the boiler system 10. Thus the water heated by the boiler section 12 is circulated around the storage tank 14 and first and second reservoirs 16,18 until it reaches a predetermined temperature, for example 50° C. At this point the valve 75 is automatically opened and the hot water can then be supplied from the storage tank 14 to the hot water system serviced by the boiler system 10 as hereinbefore described. The flow of water through the boiler system 10 in this open loop configuration is illustrated as a flow diagram in FIG. 9. As the valve 75 is now closed, the heated water being supplied from the top of the storage tank 14 flows through the outlet 54 pipework which extends through the housing 82 and is, in use, connected to the intake of the hot water system serviced by the boiler system 10. The return feed from the hot water system passes back through the housing 82 be fed to the inlet 86 of the flue gas condenser 84. Having passed through the flue gas condenser 84, the preheated water is then fed down to the inlet 56 of the first reservoir 16 where it will be brought back up to temperature by the boiler section 12 as hereinbefore described.

Figure 10:
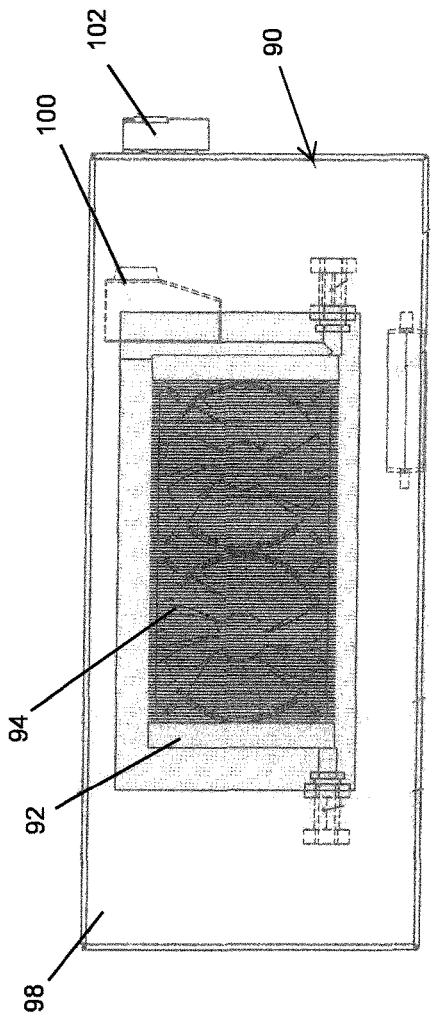
FIG. 10 illustrates a side view of a radiator forming part of the boiler system according to the present invention.
Figure 11:
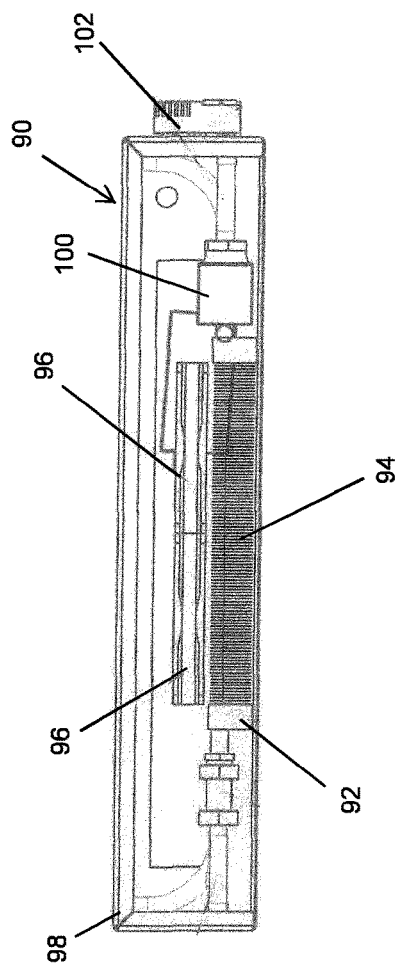
FIG. 11 illustrates a plan view of the radiator shown in FIG. 10.

Referring now to FIGS. 10 and 11, there is illustrated a novel radiator 90 which embodies an unconventional mode of operation which is better suited to the manner in which the boiler system 10 operates, whereby heated water is continuously pumped from the large capacity storage tank 14 around the hot water circuit serviced by the boiler system 10. Thus, in use, this hot water circuit may comprise a number of the radiators 90, in addition to any other hot water applications, such as ablutionary installations, washing machines, dishwashers, taps, etc.

Each of the radiators 90 comprises a heat transfer unit 92 through which the heated water is pumped from one side to another, the heat transfer unit 92 essentially consisting of a metal tube covered in a high density array of heat transfer fins 94, preferably formed of a material having a high heat conductivity such as copper, steel, etc. The radiator 90 further comprises at least one, and preferably two or more fans 96 mounted adjacent the heat transfer unit 92 and arranged to drive airflow across the heat transfer unit 92, and in particular the fins 94, in order to transfer heat from the heated water being pumped through the heat transfer unit 92 into the passing air and then out in to the room or other space to be heated by the radiator 90. The heat transfer unit 92 and the fans 96 are preferably contained within a radiator cover or enclosure 98 which is perforated or otherwise adapted to permit airflow from an interior to an exterior of the enclosure 98, in order to affect heating of the surrounding space in which the radiator 90 is located.

The radiator 90 additionally comprises a thermostat 100, preferably in the form of a pipe thermostat 100, which monitors the temperature of the heat transfer unit 92 and which is preferably in communication with the control unit 66. The radiator additionally comprises an external thermostat 102 to monitor the temperature of the room or other enclosure in which the radiator 90 is located. The operation of the fans 96 is controlled by the pipe thermostat 100, which will automatically turn the fans 96 on when the temperature within the heat transfer unit 92 reaches a predetermined temperature, for example 50° C., in order to actively extract heat from the water flowing through the heat transfer unit 92 by driving airflow across the fins 94. By forcing airflow across the heat transfer unit 92 a much greater amount of heat can be transferred to the surroundings, and due to the continuous circulation of hot water around the boiler system 10 the heat level within the heat transfer unit 92 is continually replenished.

The external thermostat 102 and the pipe thermostat 100 are electrically interconnected such that, once the temperature in the room being heated by the radiator 90 reaches the desired temperature as set by the external thermostat 102, the pipe thermostat 100 will turn the fans 94 off, and so no further heat will be blown into the room. Heated water will continue to be pumped through the heat transfer unit 92, but the fans 94 will remain off until the external thermostat 102 senses that the temperature in the room has dropped below the set level, at which point the pipe thermostat 100 will be actuated to turn the fans 94 back on.

Due to the convection action of the radiator 90, it is necessary to have a continuous flow of heated water passing through the heat transfer unit 92, as the heat is quickly extracted as a result of the forced flow of air generated by the fans 94. However only a small volume of water is required to pass through the heat transfer unit 92, and in an exemplary embodiment the heat transfer unit 92 holds approximately 0.25 liters of water, as compared to approximately 5-10 liters of water in a conventional radiator. The small volume of the heat transfer unit 92, along with the large volume of the storage tank 14, allows the boiler system 10 to supply a large number of the radiators 90, each of which is individually thermostatically controlled, allowing for a much greater degree of control over the heat levels within each room or zone of a domestic or commercial property being heated.

It will therefore be appreciated that the boiler system 10 of the present invention provides a significantly different mode of operation to conventional condensing boilers, heating only the air within the enclosure 20, which then indirectly heats all of the interior walls of the boiler section 12. In addition by having a relatively large capacity storage tank 14 mounted directly to the boiler section 12, a large thermal capacity is established which then retains significant levels of heat during periods when burner 22 is not operational, thereby significantly reducing the energy requirements to bring the water within the tank 14 back up to operating temperature. As a result the nozzle (not shown) located within the blast tube 30 and from which the flame issues to heat the enclosure 20, can be significantly reduce in size, such that the volume of fuel consumed by the system 10 per hour is reduced, for example by 50-80% compared to a conventional condensing boiler. In addition the heat contained in the exhaust gasses is recycled and fed back to the water in the storage tank 14 by means of the coil 50. These features provide a significant increase in the efficiency of the boiler, which in the exemplary embodiment illustrated utilises approximately one third the quantity of fuel during operation when compared to a conventional boiler.

The invention claimed is:

1. A boiler system comprising:
   a first reservoir and a second reservoir which together define an enclosure;
   a storage tank positioned to define one wall of the enclosure and being in fluid communication with the first reservoir;
   a heat exchange tube located in the storage tank and being in fluid communication with the second reservoir;
   a burner arranged to directly heat atmospheric gases within the enclosure in order to indirectly heat the walls of the enclosure; and wherein the first reservoir is not in fluid communication with the second reservoir.

2. The boiler system of claim 1, wherein the burner is arranged to issue a flame which does not directly heat any wall of the enclosure.

3. The boiler system of claim 1, wherein the first reservoir is arranged to define first, second, and third walls, and the second reservoir is arranged to define fourth and fifth walls, of the enclosure.

4. The boiler system of claim 1, wherein the first reservoir is arranged to define first and second side walls and a front wall of the enclosure, and the second reservoir is arranged to define a base and rear wall of the enclosure.

5. The boiler system of claim 1, wherein a lower end of the storage tank is arranged to define an upper wall of the enclosure.

6. The boiler system of claim 5, wherein the lower end of the storage tank is concave.

7. The boiler system of claim 5, wherein the lower end of the storage tank includes copper in at least the region defining the upper wall of the enclosure.

8. The boiler system of claim 5, wherein the storage tank is thermally insulated other than the portion defining the one wall of the enclosure.

9. The boiler system of claim 1, wherein the heat exchange tube includes a finned coil.

10. The boiler system of claim 1, further comprising an exhaust manifold that at least partially circumscribes the enclosure and includes at least one exhaust ports to permit combustion gases to be extracted from the enclosure.

11. The boiler system of claim 10, wherein the exhaust manifold defines an upper portion of a sidewall of the enclosure.

12. The boiler system of claim 10, further comprising an exhaust flue supplied from the exhaust manifold, and a water retaining sleeve circumscribing at least a portion of the length of the flue, the sleeve being in fluid communication between the second reservoir and the heat exchange tube.

13. The boiler system of claim 12, further comprising a first pump for pumping water around a closed circuit defined by the second reservoir, the sleeve and the heat transfer tube.

14. The boiler system of claim 13, wherein the second reservoir is in fluid communication with a lower end of the sleeve, an upper end of the sleeve is in fluid communication with a lower end of the heat transfer tube, and a lower end of the heat transfer tube is in fluid communication with the second reservoir in order to form the closed circuit.

15. The boiler system of claim 12, further comprising a heat damper on the exhaust flue.

16. The boiler system of claim 12, further comprising a flue gas condenser on the exhaust flue.

17. The boiler system of claim 1, further comprising a radiator including a heat exchange unit in fluid communication with the storage tank, and at least one fan arranged to generate a flow of air across the heat exchange unit.

18. The boiler system of claim 16, wherein the at least one fan is thermostat controlled.

19. The boiler system of claim 1, further comprising a control system including one or more sensors and one or more actuators to automatically control the operation of the system.

20. The boiler system of claim 1, further comprising a bypass circuit operable to connect an outlet of the storage tank directly to an inlet of the first reservoir such as to bypass a hot water system supplied by the boiler system.

* * * * *